United States Patent
Baba

(10) Patent No.: US 10,893,166 B2
(45) Date of Patent: Jan. 12, 2021

(54) MANAGEMENT SYSTEM, METHOD, AND PROGRAM STORAGE MEDIUM

(71) Applicant: CANON KABUSHIKI KAISHA, Tokyo (JP)

(72) Inventor: Shohei Baba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/520,863

(22) Filed: Jul. 24, 2019

(65) Prior Publication Data
US 2020/0076982 A1    Mar. 5, 2020

(30) Foreign Application Priority Data

Aug. 29, 2018 (JP) .................................. 2018-160374
Apr. 12, 2019 (JP) .................................. 2019-076235

(51) Int. Cl.
*H04N 1/32* (2006.01)
*H04N 1/327* (2006.01)

(52) U.S. Cl.
CPC ..... *H04N 1/32545* (2013.01); *H04N 1/32085* (2013.01); *H04N 1/32096* (2013.01); *H04N 1/32713* (2013.01)

(58) Field of Classification Search
None
See application file for complete search history.

(56) References Cited

U.S. PATENT DOCUMENTS

| | | | | |
|---|---|---|---|---|
| 2008/0123130 A1* | 5/2008 | Matsumoto | ........... | G06F 3/1207 358/1.15 |
| 2010/0097636 A1* | 4/2010 | Tanaka | ................... | G06F 3/1285 358/1.15 |
| 2014/0002848 A1* | 1/2014 | Matsumae | ............ | G06F 3/1238 358/1.14 |
| 2015/0355873 A1* | 12/2015 | Choi | ..................... | G06F 3/1204 358/1.15 |

FOREIGN PATENT DOCUMENTS

JP        2007110263 A    4/2007

* cited by examiner

*Primary Examiner* — Mohammad H Ghayour
*Assistant Examiner* — Pawan Dhingra
(74) *Attorney, Agent, or Firm* — Venable LLP

(57) ABSTRACT

A management system includes a plurality of network devices, a client communicating with the plurality of network devices, and a manager managing the client. The manager includes a management unit managing a destination list set including a plurality of destination lists including one or more destinations and a generation unit generating a task in which the destination list set and the network device to be distributed are set. The client includes a first determination unit that determines whether the network device to be distributed is able to manage the plurality of destination lists of the destination list set, based on the task generated by the manager and a second determination unit that determines whether the number of destinations included in the plurality of destination lists of the destination list set is within the number of destinations manageable by the network device to be distributed.

10 Claims, 11 Drawing Sheets

FIG. 4A

| 401 | 402 | 403 | 404 | 405 | |
|---|---|---|---|---|---|
| Destination ID | Destination type | Destination name | Mail address | Fax number | ... |
| f48h7f47 | e-mail | Destination 1 | xx@xx | | ... |
| : | : | : | : | : | : |

FIG. 4B

| 406 | 407 | |
|---|---|---|
| Destination list ID | Destination list name | ... |
| lhf749jf | Group 1 | ... |
| : | : | : |

FIG. 4C

| 408 | 409 | |
|---|---|---|
| Destination list set ID | Destination list set name | ... |
| ojb37f9 | Destination list set 1 | ... |
| : | : | : |

FIG. 4D

| 410 | 411 | 412 | |
|---|---|---|---|
| Device ID | Device name | Device type | ... |
| m2v5s0fz | Device 1 | Type 1 | ... |
| : | : | : | : |

FIG. 4E

| 406 | 401 |
|---|---|
| Destination list ID | Destination ID |
| lhf749jf | f48h7f47 |
| : | : |

FIG. 4F

| 408 | 406 | 413 |
|---|---|---|
| Destination list set ID | Destination list ID | Destination list type |
| ojb37f9 | lhf749jf | Destination list (1) |
| : | : | : |

FIG. 4G

| 410 | 408 |
|---|---|
| Device ID | Destination list set ID |
| m2v5s0fz | ojb37f9 |
| : | : |

FIG. 5A

| Task ID | Task type | Schedule | Subsequent start time | ... |
|---|---|---|---|---|
| 11111 | Destination list distribution | Executed at 10:00 every Tues. | 2018/01/09 10:00:00 | ... |
| 22222 | Config. information distribution | Executed at 10:00 | 2018/05/10 10:00:00 | ... |
| : | : | : | : | : |

FIG. 5B

| Task ID | Target ID | ... |
|---|---|---|
| 11111 | AAA1111 | ... |
| 11111 | AAA2222 | ... |
| : | : | : |

FIG. 6A

| | 601 | 602 | 603 | 604 | 605 | 606 | 607 | |
|---|---|---|---|---|---|---|---|---|
| | Instance ID | Task ID | Task type | Contents | Generation date and time | Completion date and time | Status | ... |
| | 7327597 | 11111 | Destination list distribution | {} | 2018/01/09 10:01:00 | 2018/01/09 10:10:00 | Failure | ... |
| | 1548151 | 22222 | Config. information distribution | {} | 2018/05/10 10:01:00 | 2018/05/10 10:21:00 | Success | ... |
| | : | : | : | : | : | : | : | : |

FIG. 6B

| | 601 | 608 | 609 | 610 | 611 | 612 | 613 | |
|---|---|---|---|---|---|---|---|---|
| | Instance ID | Client ID | Device ID | Sub-task contents | Sub-task completion date and time | Sub-task status | Result | ... |
| | 7327597 | client01 | device01 | [ "Destination list identification information", "Destination list type", "Device type" ] | 2018/01/09 10:02:00 | Success | Success | ... |
| | 7327597 | client01 | device02 | [ ] | 2018/01/09 10:03:00 | Failure | Communication error | ... |
| | : | : | : | : | : | : | : | : |

| | 701 | 702 | 703 | |
|---|---|---|---|---|
| | Notification ID | Client ID | Task type | ... |
| | ufj84f0q | client01 | Destination list distribution | ... |
| | : | : | : | : |

FIG. 12

Task result list

| Task name | Task type | Status | | Task ID | Completion date and time |
|---|---|---|---|---|---|
| Task 1 | Destination list distribution | Failure | Recovery | 11111 | 2018/01/09 10:10:00 |
| Task 2 | Config. information distribution | Success | | 22222 | 2018/05/10 10:21:00 |

FIG. 13

Generate recovery task

Schedule / Device

| | Device ID | Device name | ... |
|---|---|---|---|
| ☐ | device02 | Device 2 | ... |
| ☐ | device03 | Device 3 | ... |

Save

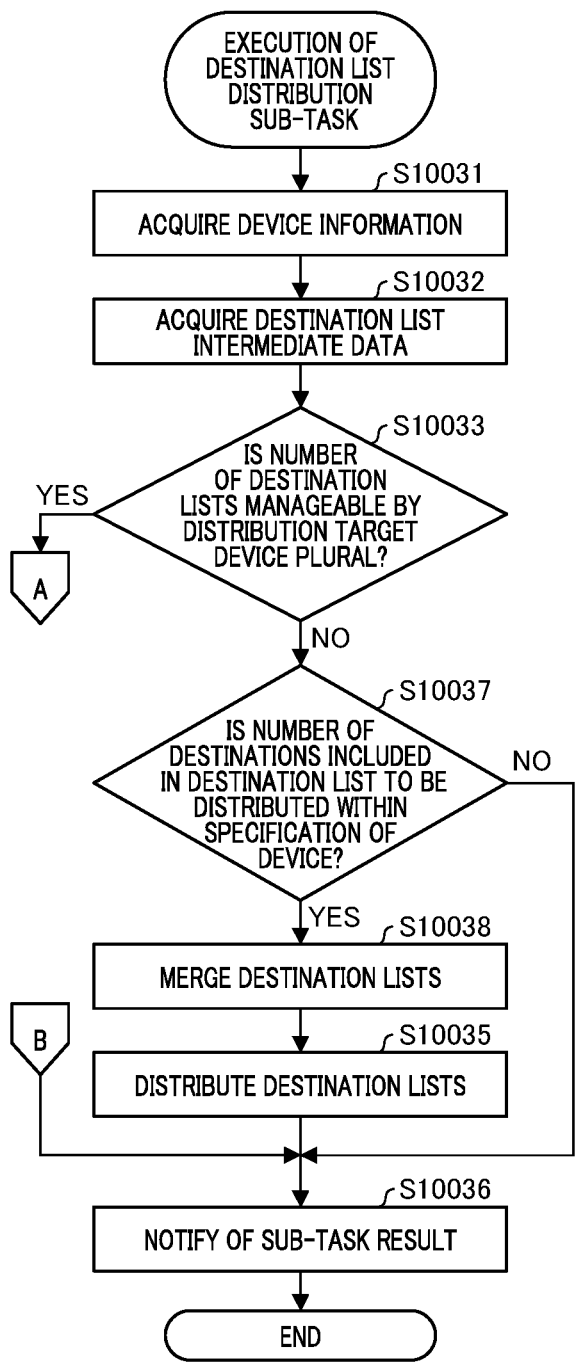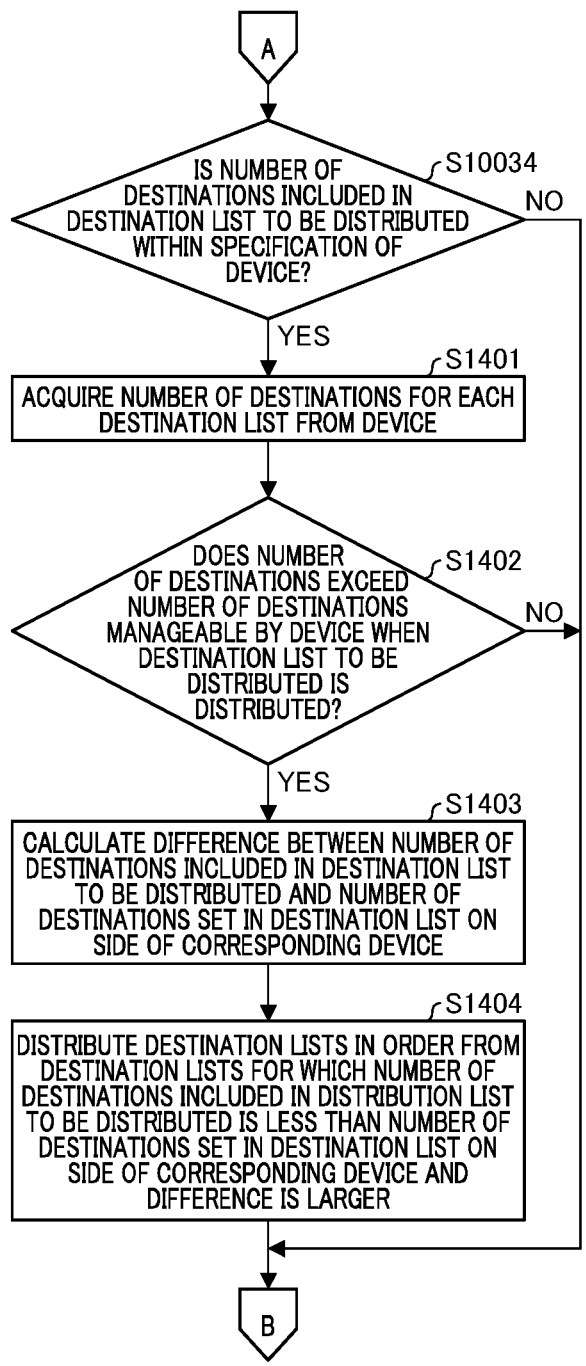

MANAGEMENT SYSTEM, METHOD, AND PROGRAM STORAGE MEDIUM

BACKGROUND OF THE INVENTION

Field of the Invention

The present invention relates to a technology for distributing destination information to different types of network devices.

Description of the Related Art

In the related art, there are management systems that distribute data including destinations such as telephone numbers, mail addresses, information indicating file transmission destinations, or the like to management objective network devices. In some case, the data is distributed as a destination list in which one or more destinations are collected.

Japanese Unexamined Patent Publication No. 2007-110263 discloses a technology for distributing an address book with a distribution condition to a plurality of network devices from a server and storing the received address book in the network device meeting the distribution condition.

It is assumed that there are various types (models or functional configurations) of network devices to receive distribution data from the management system. Depending on the number of destinations, the size or format of a destination list, or the like distributed from the management system, appropriate management may not be realized in the network device to receive the distribution data in some cases. Accordingly, it is necessary for the management system to generate distribution data in consideration of a type of device of a distribution destination.

On the other hand, when a destination is desired to be simultaneously distributed to the plurality of network devices, it takes a considerable amount of time for an operator of the management system to generate the distribution data individually in accordance with a distribution destination.

SUMMARY OF THE INVENTION

The present invention provides a structure capable of appropriately distributing destination information to a plurality of network devices while reducing troublesome work of an operator.

A management system according to a preferred embodiment of the present invention comprises: a plurality of network devices; a client configured to communicate with the plurality of network devices; and a manager configured to manage the client. The manager includes a first memory storing first instructions, and a first processor executing the first instructions causing the manager to: manage a destination list set including a plurality of destination lists including one or more destinations and generate a task in which the destination list set and the network device to be distributed are set. The client includes a second memory storing second instructions, and a second processor executing the second instructions causing the client to: execute first determination for determining whether the network device to be distributed is able to manage the plurality of destination lists of the destination list set, based on the task generated by the manager, execute second determination for determining whether the number of destinations included in the plurality of destination lists of the destination list set is within the number of destinations manageable by the network device to be distributed, distribute distribution data including a plurality of destination lists of the destination list set to the network device to be distributed when it is determined in the first determination that the network device to be distributed is able to manage the plurality of destination lists and it is determined in the second determination that the number of destinations included in the plurality of destination lists of the destination list set is within the number of manageable destinations, and generate destination lists manageable by the network device to be distributed using the destinations included in the plurality of destination lists of the destination list set when it is determined in the first determination that the network device to be distributed is not able to manage the plurality of destination lists and it is determined in the second determination that the number of destinations included in the plurality of destination lists of the destination list set is within the number of manageable destinations. The distribution data including the generated destination lists is distributed to the network device to be distributed.

According to the present invention, it is possible to appropriately distribute destination information to a plurality of network devices while reducing troublesome work of an operator of the management system.

Further features of the present invention will become apparent from the following description of exemplary embodiments with reference to the attached drawings.

BRIEF DESCRIPTION OF THE DRAWINGS

FIGS. 4A to 4G are diagrams illustrating examples of destination list management information.

FIGS. 5A and 5B are diagrams illustrating examples of task management information.

FIGS. 6A and 6B are diagrams illustrating examples of task management information.

FIG. 12 is a diagram illustrating an example of a task result list screen.

FIG. 13 is a diagram illustrating an example of a recovery task generation screen.

FIGS. 14A and 14B are flowcharts illustrating an example of an operation process of the client device according to a fourth embodiment.

DESCRIPTION OF THE EMBODIMENTS

Preferred embodiments of the invention will be described with reference to the drawings.

Here, constituent elements described in the following description are merely exemplary and the scope of the present invention is not limited thereto.

<System Configuration>

Figure 1:
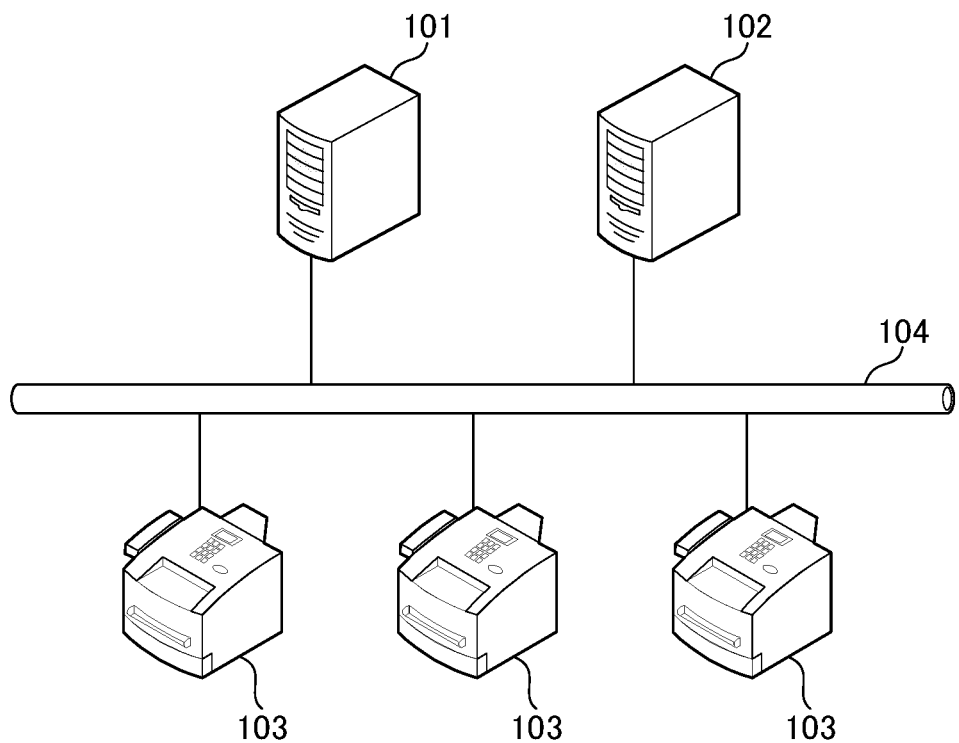
FIG. 1 is a diagram illustrating an overall system.

FIG. 1 is a diagram illustrating an overall system.

A system according to an embodiment is a device management system. The system includes a client device 102 that distributes one or more destination lists to one or more devices and a management server 101 that serves as a manager managing the client device 102 and the destination lists distributed by the client device 102.

The management server (the manager) 101 is connected to the client device 102 via a LAN 104. A plurality of network devices 103 are also connected to the LAN 104. The management server 101 centralized manages data of the client device 102 and the plurality of network devices 103. The plurality of network devices 103 are devices such as laser beam printers (LBPs) or multi-function peripherals (MFPs). The plurality of network devices 103 are monitored by the client device 102.

The client device 102 manages the plurality of network devices 103 via the LAN 104. The client device 102 communicates with the plurality of network devices 103 and distributes a destination list to the plurality of network devices 103, or the like.

<Hardware Configurations of Client Device and Management Server>

Figure 2:
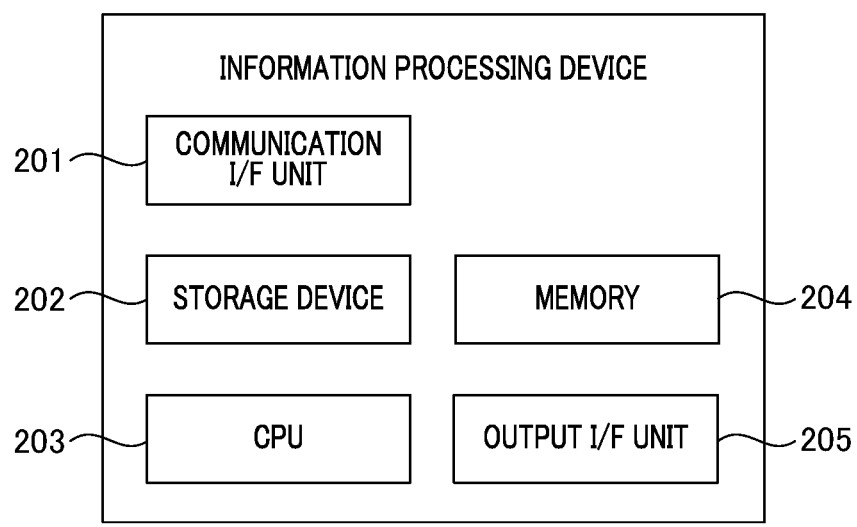
FIG. 2 is a block diagram illustrating an example of a hardware configuration of a management server and a client device.

FIG. 2 is a block diagram illustrating an example of a hardware configuration of information processing devices such as the management server 101 and the client device 102.

The information processing device includes a communication OF unit 201, a storage device 202, a CPU 203, a memory 204, and an output OF unit 205.

The communication OF unit 201 is a network interface that communicates with an external system or device.

The storage device 202 stores an operating system (OS), a program, management data, data collected from an external system or device, or the like.

The CPU 203 loads a program from the storage device 202 to the memory 204 and executes the program.

The output OF unit 205 is connected with an output device such as a display, and output an execution result of a program or the like.

In the management server 101, the storage device 202 stores a management program for realizing functions to be described below in FIG. 3. On the other hand, in the client device 102, the storage device 202 stores a client program for realizing functions to be described below in FIG. 8.

One information processing device operates as the management server 101 and the client device 102. In this case, the management program and the client program are installed in the storage device 202 and the CPU 203 executes both the management program and the client program. In a case in which one information processing device operates both the management server 101 and the client device 102, the management server 101 communicates with the client device 102 in the same device.

<Software Configuration of Management Server>

Figure 3:
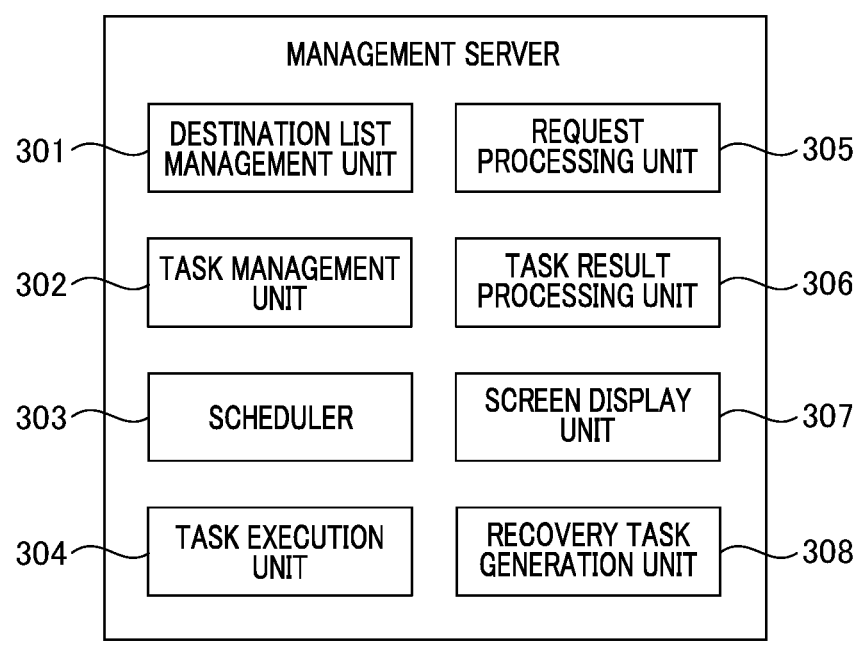
FIG. 3 is a block diagram illustrating an example of a software configuration of the management server.

FIG. 3 is a block diagram illustrating an example of a software configuration of the management server 101.

A destination list management unit 301 manages destination list management information that includes destination list information used for collectively managing one or more piece of destination information. The destination list management information is necessary for distributing the destination list to the network devices 103. The details of the destination list management information will be described later.

A task management unit 302 manages task management information that includes task information for distributing one or more destination lists and schedule information for executing a task. The task management information is necessary for managing the tasks. The details of the task management information will be described later.

A scheduler 303 executes schedule management of task execution, activation of a task to be executed, and task processing start notification to the client device 102.

A task execution unit 304 registers information necessary for the client device 102 to execute a task in the storage device 202 and generates intermediate data of destination list information to be distributed. The intermediate data includes information regarding a destination list and destination information included in the destination list.

A request processing unit 305 processes various requests (a device information acquisition request, a task information acquisition request, and the like) from the client device 102.

A task result processing unit 306 receives a task result notified of by the client device 102 and stores the task result in the storage device 202.

A screen display unit 307 displays the task result or the like.

Since a recovery task generation unit 308 is not related to the embodiment, description of the recovery task generation unit 308 will be omitted herein.

<Example of Destination List Management Information Managed by Management Server>

FIGS. 4A to 4G are diagrams illustrating examples of the destination list management information.

The destination list management information is information registered in advance by a user.

First, a destination management table (see FIG. 4A) for managing destination information will be described.

The destination information is a part of information included in the destination list information. In other words, the destination list information is information in which destination information is grouped.

Destination IDs 401 are information for identifying destination information.

Destination types 402 are information indicating types of destinations. For example, destination types are e-mail, FAX, and the like.

Destination names 403 are the names of destinations.

Mail addresses 404 are information indicating destination information when an e-mail function is used.

FAX numbers 405 are information indicating destination information when a FAX function is used.

Next, a destination list management table (see FIG. 4B) for managing the destination list information will be described.

Destination list IDs 406 are information for uniquely identifying the destination list information.

Destination list names 407 are names of destination lists.

Next, a destination list set management table (see FIG. 4C) for managing destination list set information will be described.

The destination list set information is information for grouping and managing the destination list information and is information indicating which destination list in the management server 101 is applied to which destination list of a device. The destination list set information includes a plurality of pieces of destination list information and each piece of destination information includes one or more destinations. The type of destination list set does not depend on a device type and there is only one type of destination list.

Destination list set IDs 408 are information for uniquely identifying destination list set information.

Destination list set names 409 are names of destination list sets.

Next, a device management table (see FIG. 4D) for managing device information to be managed by the device management system will be described.

Device IDs 410 are information for identifying devices.

Device names 411 are names of the devices.

Device types 412 are information indicating model information regarding the devices. A user may input the information when the devices are registered or the management server may determine and register a model based on the information acquired from the device at an appropriate timing after the devices are registered.

Further, there are a destination list & destination management table (see FIG. 4E) for associating the destination lists with the destinations, a destination list set & destination list management table (see FIG. 4F) for associating the destination list sets with the destination lists, and a device & destination list set management table (see FIG. 4G) for associating the devices with the destination list sets. In these tables, pairs of pieces of ID information are retained in association with each other.

In the destination list set & destination list management table, the destination list type 413 corresponding to each pair is maintained in addition to the pair of pieces of ID information. The destination list type 413 is information indicating which destination list in the management server 101 is distributed to which destination list in the device.

<Example of Task Management Information Managed by Management Server>

FIGS. 5A, 5B, 6A, 6B, and 7 are diagrams illustrating examples of task management information.

FIG. 5A illustrates a task schedule management table for managing a schedule of tasks and FIG. 5B illustrates a task target management table for managing target devices of the tasks. The information is information registered in advance by the user.

First, the task schedule management table (see FIG. 5A) will be described.

Task IDs 501 are information for uniquely identifying tasks.

Task types 502 are information for specifying types of tasks.

Schedules 503 are information indicating schedules used to execute tasks. The information is information set when the user generates tasks. Examples of the schedules which can be set include "instant execution," "date and time destination," and "periodic schedule destination."

Next start times of tasks 504 are information indicating times at which tasks are executed subsequently at next start times of the tasks. The information is calculated by the scheduler 303 based on the registration of the tasks and the schedules set by the user at the time of execution.

Next, a task target management table (see FIG. 5B) will be described.

The task IDs 501 are the same as those described in the task schedule management table.

Target IDs 505 are information for uniquely identifying target devices in which tasks are executed.

FIG. 6A illustrates a task instance management table for managing task instance information and FIG. 6B illustrates a sub-task instance management table for managing sub-task instance information. A sub-task is a task allocated for each target device.

First, the task instance management table (see FIG. 6A) will be described.

Instance IDs 601 are information for uniquely identifying task instances.

Task IDs 602 are information for uniquely identifying tasks.

Task types 603 are information for specifying types of tasks.

Contents 604 are detailed information necessary to execute the tasks.

Generation dates and times 605 are dates and times at which task instances are generated.

Completion dates and times 606 are dates and times at which execution of the tasks is completed.

Statuses 607 are information indicating execution results of the tasks.

Next, a sub-task instance management table (see FIG. 6B) will be described.

Instance IDs 601 are similar to the instances ID described in the task instance management table.

Client IDs 608 are information indicating identification information of client devices executing sub-tasks.

Device IDs 609 are information for identifying target devices of the sub-tasks.

Sub-task contents 610 are detailed information necessary to execute the sub-tasks. For example, the information is destination list identification information to be distributed, destination list type information indicating which destination list in the management server 101 is distributed to which destination list in a device, or information regarding model determination information of a target device.

Sub-task completion dates and times 611 are dates and times at which execution of the sub-tasks is completed.

Sub-task statuses 612 are information indicating execution statuses of the sub-tasks.

Results 613 are information indicating execution results of the sub-tasks.

Figures 7, 8:
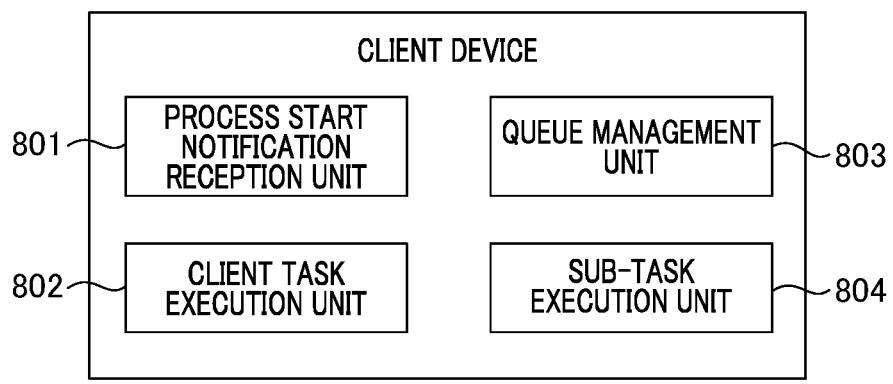
FIG. 7 is a diagram illustrating an example of task management information.
FIG. 8 is a block diagram illustrating an example of a software configuration of the client device.

FIG. 7 illustrates a task execution notification table for managing task execution notification information (information indicating a client to which task execution is notified).

Notification IDs 701 are information for uniquely identifying notification information.

Client IDs 702 are information for identifying clients which are notified of task execution.

Task types 703 are information indicating tasks which are executed in the clients.

<Software Configuration of Client Device>

FIG. 8 is a block diagram illustrating an example of a software configuration of the client device 102.

A process start notification reception unit 801 receives a process start notification of a task from the management server 101.

A client task execution unit 802 acquires task information or device information to be executed and generates a sub-task as a task of each target device.

A queue management unit 803 stores a sub-task in a queue or extracts the sub-task from the queue, or the like.

A sub-task execution unit 804 executes a process of acquiring intermediate data of the device information and the destination list information and generating destination information for distribution, a process of distributing the destination list to the network device 103, a process of notifying an execution result of a task to the management server 101, and the like.

First Embodiment

—Operation of Management Server

Figure 9A:
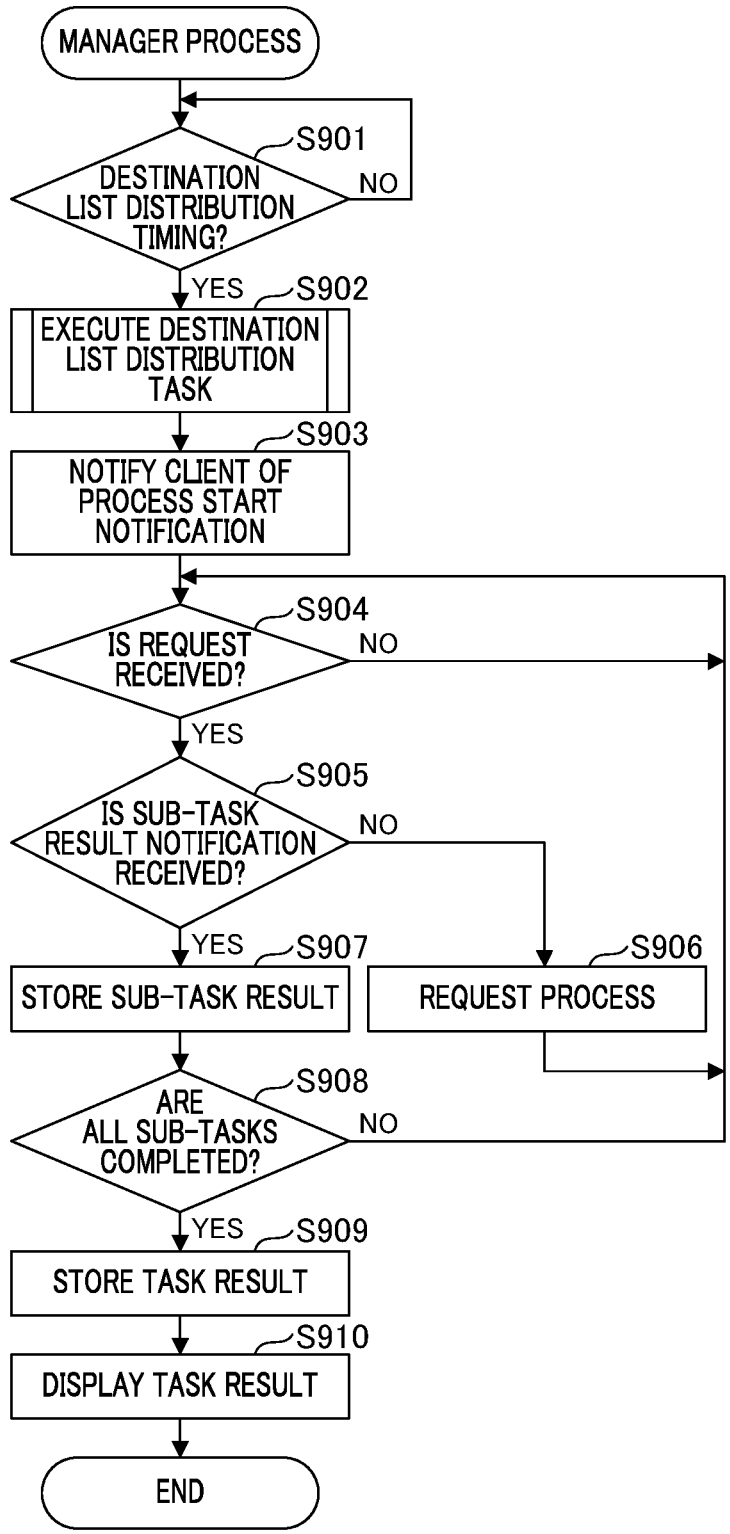
FIGS. 9A and 9B are flowcharts illustrating examples of an operation process of the management server.
Figure 9B:
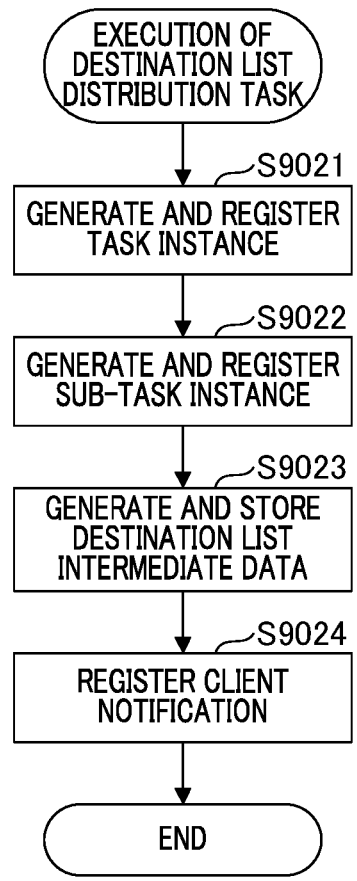

FIGS. 9A and 9B are flowcharts illustrating examples of an operation process of the management server 101.

FIG. 9A illustrates a main flow and FIG. 9B illustrates a sub-routine S902 of FIG. 9A.

First, in S901 of FIG. 9A, the scheduler 303 acquires information from the task management unit 302 and determines whether an execution time of a task is a time before a current time. When the execution time of the task is a time before the current time, the scheduler 303 determines that the execution time of the task has reached a task execution timing, the process proceeds to S902. Conversely, when the execution time of the task is a time after the current time, the scheduler 303 determines that the execution time of the task has not reached the task execution timing, the process repeats S901.

Subsequently, in S902, the task execution unit 304 executes a destination list distribution task (see FIG. 9B).

In the destination list distribution task, the task execution unit 304 first generates a task instance and registers the task instance in the storage device 202 via the task management unit 302 (S9021). Subsequently, the task execution unit 304 generates an instance of a sub-task and registers the instance of the sub-task in the storage device 202 via the task management unit 302 (S9022). Subsequently, the task execution unit 304 acquires destination list information to be distributed from the destination list management unit 301, generates intermediate data for each destination list, and stores the intermediate data in the storage device 202 (S9023). Finally, the task execution unit 304 registers the task execution notification information for notifying the client device 102 of task execution in the storage device 202 via the task management unit 302 (S9024).

Subsequently, in S903, the scheduler 303 executes task execution notification to the client device 102.

Thereafter, in S904, the request processing unit 305 determines whether there is a request from the client device 102. When there is the request, the process proceeds to S905. Conversely, when there is no request, the process returns to S904.

Subsequently, in S905, the request processing unit 305 determines whether request content is sub-task result notification. When the request content is the sub-task result notification, the process proceeds to S907. Conversely, when the request content is not the sub-task result notification, the process proceeds to S906.

In S906, the request processing unit 305 executes a process in response to the request. For example, when the request is a request for acquiring information regarding a designated device, the device information is acquired from the storage device 202 and a response is executed.

Subsequently, in S907, the task result processing unit 306 stores a result of the sub-task received from the client device 102 in the storage device 202 via the task management unit 302.

In S908, the task result processing unit 306 determines whether all the sub-tasks related to the task are completed based on the statuses of the sub-tasks stored in the sub-task instance management table (see FIG. 6B). When it is determined that all the sub-tasks are completed, the process proceeds to S909. When it is determined that not all the sub-tasks are completed, the process repeats S904.

Subsequently, in S909, the task result processing unit 306 stores the result of the task in the storage device 202 via the task management unit 302.

In S910, the screen display unit 307 displays the result of the task and the results of the sub-tasks stored in the storage device 202 on a screen.

—Operation of Client Device

Figure 10A:
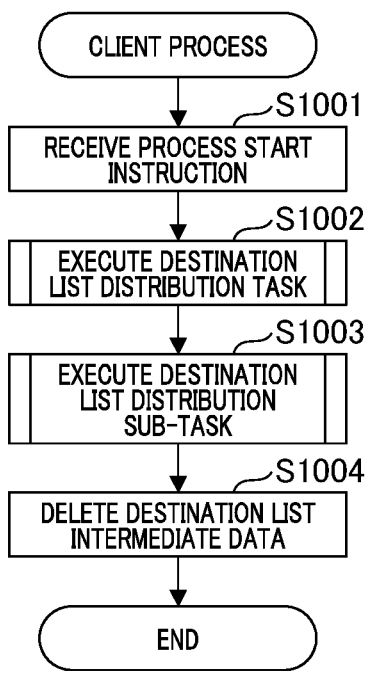
FIGS. 10A to 10C are flowcharts illustrating examples of an operation process of the client device.
Figure 10C:
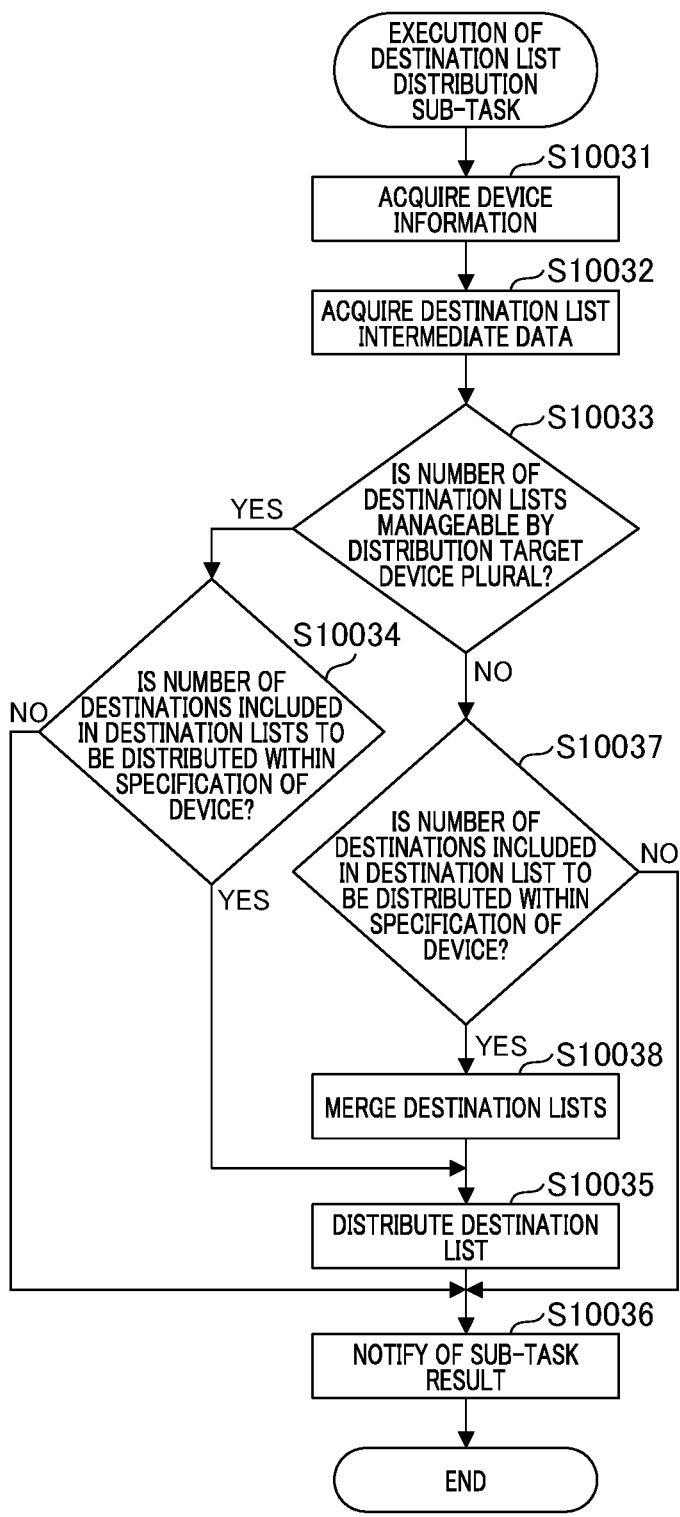
Figure 10B:
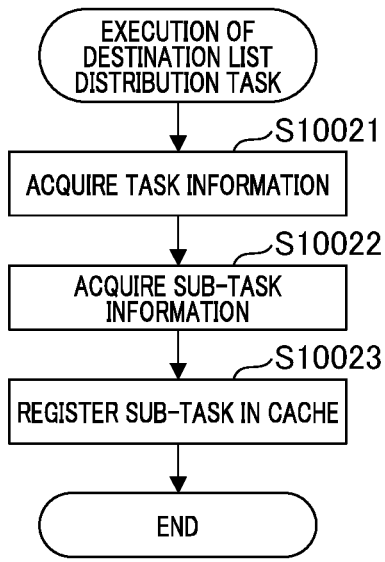

FIGS. 10A to 10C are flowcharts illustrating examples of an operation process of the client device 102.

FIG. 10A illustrates a main flow, FIG. 10B illustrates a sub-routine S1002 of FIG. 10A, and FIG. 10C illustrates a sub-routine S1003 of FIG. 10A.

First, in S1001, the process start notification reception unit 801 receives a process start notification from the management server 101.

Subsequently, in S1002, the client task execution unit 802 executes a destination list distribution task.

In the destination list distribution task, the client task execution unit 802 first acquires task information from the management server 101 (S10021). Subsequently, the client task execution unit 802 acquires all the sub-task information related to the task from the management server 101 (S10022). Finally, the queue management unit 803 generates a sub-task in which the acquired task information and sub-task information are recorded and registers the sub-task in a queue (S10023).

Subsequently, in S1003, the sub-task execution unit 804 executes a destination list distribution sub-task.

In the destination list distribution sub-task, when information regarding the distribution target device is cached in the client device 102 corresponding to the sub-task execution unit 804, the sub-task execution unit 804 first acquires the information. When the information is not cached, distribution target device information is acquired from the management server 101 and is cached in the client device 102 (S10031).

The device information is not acquired from the management server 101 whenever the sub-task is executed. After the client device 102 is activated, the device information is acquired from the management server 101 only in the first task execution of the distribution target device. Thus, network traffic between the client device 102 and the management server 101 is reduced.

Subsequently, when intermediate data of the destination list information to be distributed is cached in the client device 102 corresponding to the sub-task execution unit 804, the sub-task execution unit 804 acquires the information. When the intermediate data is not cached, intermediate data of the destination list information to be distributed is acquired from the management server 101 and is cached in the client device 102 (S10032).

The intermediate data of the destination list information is not acquired from the management server 101 whenever the sub-task is executed. The intermediate data of the destination list information is acquired from the management server 101 only when the destination list to be distributed is not cached inside the client device 102 in each execution of the sub-task. Thus, the destination list can be shared in each sub-task. As a result, network traffic between the client device 102 and the management server 101 is reduced.

Subsequently, the sub-task execution unit 804 determines whether the number of destination lists manageable by the distribution target device is plural (S10033). A value of the number of manageable destination lists is retained inside the client device in advance for each device type.

When the number of destination lists manageable by the distribution target device is plural, the sub-task execution unit 804 determines whether a total sum of the destinations included in all the destination lists to be distributed is within a specification of the distribution target device (S10034).

That is, in S10034, the sub-task execution unit 804 determines whether the total number of the destinations included in all the destination lists to be distributed is within the number of destinations manageable by the distribution target devices.

The determination in S10034 is realized by retaining an upper limit of the number of manageable destinations in the client device for each device type.

When it is determined in S10034 that the number of destination lists is within the specification of the device, the sub-task execution unit 804 generates distribution data from the plurality of destination lists included in the destination list information and distributes the distribution data to the distribution target devices (S10035). Further, the sub-task execution unit 804 notifies the management server 101 of information regarding a distribution result (success) as an execution result of the sub-tasks (S10036).

Conversely, when it is determined in S10034 that the number of destination lists is not within the specification of the device, the sub-task execution unit 804 notifies the management server 101 of an execution result of the sub-task indicating a distribution error in S10036.

When it is determined in S10033 that the number of destination lists manageable by the distribution target device is not plural, the process proceeds to S10037.

As in S10034, the sub-task execution unit 804 determines whether a total sum of destinations included in each of the plurality of destination lists to be distributed is within the specification of the distribution target device (S10037).

When the total sum of destinations is within the specification of the device, one destination list including all the destinations included in each of the plurality of destination lists to be distributed is generated (S10038).

Thereafter, the sub-task execution unit 804 distributes the distribution data including the generated one destination list to a distribution target network device (S10035). Then, the management server 101 is notified of information regarding a distribution result (success) as a sub-task result (S10036).

Conversely, when it is determined in S10037 that the total sum of destinations is not within the specification of the device, the sub-task execution unit 804 notifies the management server 101 of an execution result of the sub-task indicating a distribution error in S10036.

As described above, in S10033, the sub-task execution unit 804 determines whether the number of destination lists manageable by the distribution target device is plural. The distribution target device can manage about 2 or 3 destination lists. At the same time, depending on a model of a device, it is considered that 10 or more destination lists may not be managed in some cases. In such cases, in S10033, the sub-task execution unit 804 may compare an upper limit of the number of destination lists manageable by the distribution target device with the number of destination lists set in the tasks to be distributed for the determination. At this time, when the number of destination lists set in the tasks to be distributed is within the upper limit, the process proceeds to S10034. Otherwise, the process proceeds to S10037.

Thereafter, when "yes" is determined in S10037, at least one or more destination lists are generated within the upper limit of the destination lists manageable by the distribution target device. For example, when a type of destination list such as an individual type or a sharing type is different, the destination lists equivalent to the number of types are considered to be generated by collecting the destinations included in each of the same type of destination lists to one destination list. In this case, the distribution data including the destination lists equivalent to the generated types of destination lists is distributed to a distribution target network device in S10035.

Subsequently, in S1004, the client task execution unit 802 deletes the intermediate data of the destination list information cached in the client device 102.

The generation of a destination list for distribution in the client device 102 leads to a reduction in a load on the side of the management server 101. From the viewpoint of load sharing, it is obviously more effective to generate the destination list for distribution to a target device in each client device 102 than to generate the destination list for distribution to all the devices in the management server 101. Further, by caching the device information or the destination list information in the client device 102 and sharing between the sub-tasks, it is possible to reduce network traffic between the management server 101 and the client device 102.

As described above, in the first embodiment, the destination lists are managed in one kind of destination list set which does not depend on a device type. By generating the destination list in accordance with the type of distribution target device based on information in the destination list set at the time of the destination list distribution, the user can easily manage the destination lists. Further, in the client device, by generating the destination list for distribution based on the intermediate data of the destination list, it is possible to reduce a load on the management server. In the client device, by caching the device information or the destination list information and sharing the device information or the destination list information between the sub-tasks, it is possible to reduce network traffic between the management server and the client device.

Second Embodiment

In the above-described first embodiment, the destination list information is merged to distribute the plurality of destination lists to a device which can manage only one destination list when the destination list is distributed (see S10038 of FIG. 10C). Here, when the number of destinations to be distributed is greater than the number of destinations manageable by the corresponding distribution target device at the time of merging, an error occurs (see S10037 and S10036 of FIG. 10C).

However, for the device in which an error occurs, the user may have a trouble in generating a task from the first to execute the task again. Depending on a cause for the error, there is a failure case even when the task is executed again. For example, a case in which the destination information exceeding the number of destinations manageable by the device as described above is distributed is the failure case. Since the failure is known, it is wasteful to execute the process.

In the second embodiment, based on the above description, a structure in which the user is allowed to easily generate the task again and can select only a device in which there is a possibility of success when the process is executed again will be described.

—System Configuration

A diagram of the overall system is illustrated in FIG. 1. Since the overall system has been described above, the description thereof will be omitted herein.

—Hardware Configuration of Management Server

A hardware configuration of the management server is illustrated in FIG. 2. Since the hardware configuration of the management server has been described above, the description thereof will be omitted herein.

—Software Configuration of Management Server

A software configuration of the management server is illustrated in FIG. 3. In the second embodiment, the software configuration is different from the above-described software configuration in the following points. Since the other points have been described in FIG. 3, the description thereof will be omitted herein.

The recovery task generation unit 308 automatically generates a recovery task for targeting only a device that executes a task again in accordance with a recovery instruction.

—Operation of Management Server

Figure 11A:
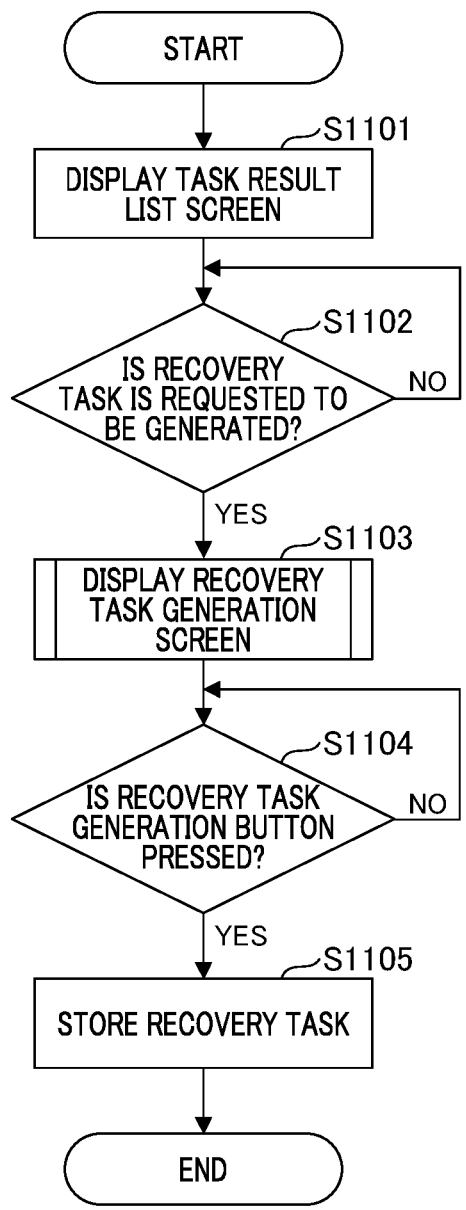
FIGS. 11A and 11B are flowcharts illustrating an example of an operation process of the management server.
Figure 11B:
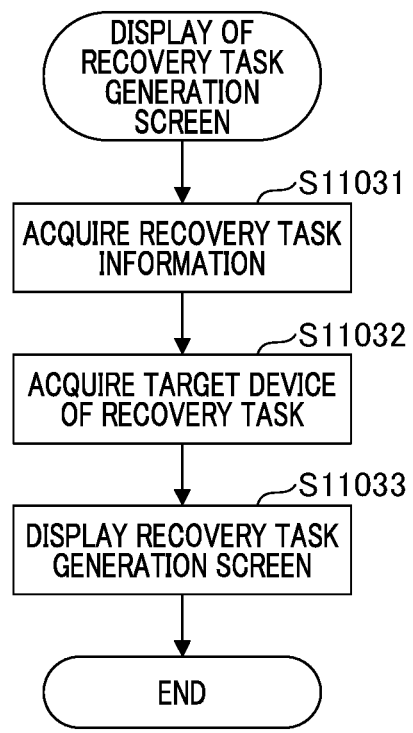

FIGS. 11A and 11B are flowcharts illustrating an example of an operation process of the management server 101.

FIG. 11A illustrates a main flow and FIG. 11B illustrates a sub-routine S1103 of FIG. 11A.

First, in S1101 of FIG. 11A, the screen display unit 307 outputs a task result list screen in response to a request from the user.

Here, the task result list screen will be described.

FIG. 12 is a diagram illustrating an example of a task result list screen.

When the task result list screen is displayed, the screen display unit 307 acquires information from the task instance management table described in the first embodiment and displays the content. For the task of which an execution result fails, a recovery button is disposed and a link to a recovery task generation screen is executed.

The flowchart is referred to for description.

Subsequently, in S1102, the screen display unit 307 determines whether the user presses the recovery button on the task result list screen, that is, whether a recovery task is requested to be generated. When the recovery button is pressed, the process proceeds to S1103. Conversely, when the recovery button is not pressed, the process repeats S1102.

Subsequently, in S1103, the screen display unit 307 displays the recovery task generation screen.

That is, the screen display unit 307 requests the recovery task generation unit 308 to generate a recovery task and acquires recovery task information (S11031).

Subsequently, the recovery task generation unit 308 acquires the source information of a task to be recovered from the task schedule management table and generates the recovery task based on the source information. The recovery task generation unit 308 further acquires information of a target device of the recovery task (S11032).

Here, the target device is a device in which the process of the task failed and cause of the failure was other than that the destination information exceeded the number of destinations manageable by the device. The target device is specified using information included in the sub-task instance management table (see FIG. 6B).

Finally, the recovery task generation unit 308 displays the recovery task generation screen based on the acquired information (S1103).

Here, the recovery task generation screen will be described.

FIG. 13 is a diagram illustrating an example of a recovery task generation screen.

The recovery task generation screen includes a screen in which source information of a task to be recovered (schedule, a task name, or the like) is displayed in advance and a selection screen on which a list of the target devices of the recovery task is displayed. The selection screen displays a save button for registering the task information generated using the screen to the storage device 202.

The flowchart is referred to for description.

Subsequently, in S1104, the screen display unit 307 determines whether a recovery task generation button is pressed. When the recovery task generation button is pressed, the process proceeds to S1105. Conversely, when the recovery task generation button is not pressed, the process repeats S1104.

Finally, in S1105, the recovery task generation unit 308 registers recovery task information in the storage device 202 based on information input on the recovery task generation screen.

As described above, according to the second embodiment, the screen display unit 307 generates the recovery task generation screen on which the source task information of the task to be recovered is input when the recovery task is generated. Of the devices in which the process fails, only the device in which there is a possibility of success when the process is executed again can be selected on the screen. Accordingly, the user can easily generate the recovery task.

Third Embodiment

In the above-described first embodiment, the destination list information is merged to distribute the plurality of destination lists to a device which can manage only one destination list when the destination lists are distributed (see S10038 of FIG. 10C). Here, when the number of destinations to be distributed is greater than the number of destinations manageable by the corresponding distribution target device at the time of merging, an error occurs (see S10037 and S10036 of FIG. 10C).

In this case, however, destination lists to be distributed are desired to be merged for distribution within a range which does not exceed the number of destinations manageable by the device without an error in some cases. Accordingly, when the number of destinations to be distributed is greater than the number of destinations manageable by the distribution target device, the user may be allowed to select considering as an error or distributing the destination lists merged so as not to exceed the number of destinations manageable by the device in advance.

Then, when the destination lists are distributed, a subsequent process can also be switched based on the selected information. When the destination lists to be distributed are merged to be within the range which does not exceed the number of destinations manageable by the device, the user may be allowed to select priority of the merged destination lists in advance. In this case, when the destination lists are distributed, an order of the destination lists which are merged is controlled from information regarding the priority.

Fourth Embodiment

In the above-described first embodiment, when the destination lists are distributed, it is determined whether the number of destinations included in the destination lists to be distributed satisfies the specification of the device. However, when the destination lists are distributed to the device that can manage the plurality of destination lists, the total number of destinations of the distribution target device exceeds the specification of the device as a result of the distribution in some cases although each number of destinations of the destination lists to be distributed satisfies the specification of the device. When the destinations are distributed for each destination list in these cases, only some of the destination lists are distributed and appropriate destination list management may not be realized. Even when the distribution lists are distributed, the total number of destinations exceeds the specification of the devices midway in the distribution order as a result of the distribution for each destination list in some cases although the total number of destinations of the distribution target device does not exceed the specification of the device mathematically. Here, a structure for handling these cases will be described.

—System Configuration

A diagram of the overall system is illustrated in FIG. 1. Since the overall system has been described above, the description thereof will be omitted herein.

—Hardware Configuration of Management Server

A hardware configuration of the management server is illustrated in FIG. 2. Since the hardware configuration of the management server has been described above, the description thereof will be omitted herein.

—Software Configuration of Management Server

A software configuration of the management server is illustrated in FIG. 3. Since the other points have been described in FIG. 2, the description thereof will be omitted herein.

—Operation of Management Server

Since an operation of the management server is similar to that of the first embodiment, the description thereof will be omitted herein.

—Operation of Client Device

Only the process of S1003 (destination list distribution sub-task execution process) which is a difference from the first embodiment will be described.

FIGS. 14A and 14B illustrate a sub-routine S1003 of FIG. 10A described in the first embodiment.

Since S10031 to S10038 are the same as content described in the first embodiment, only processes of S1401 to S1404 will be described.

In FIG. 14B, when the determination of S10034 is "yes", the sub-task execution unit 804 first acquires the number of destinations for each destination list from the distribution target device (S1401). A method of acquiring the number of destinations may be a method of acquiring destination list data actually and analyzing the destination list data.

Subsequently, the sub-task execution unit 804 determines whether the number of destinations included in the destination list to be distributed exceeds the number of destinations manageable by the device (S1402). Specifically, calculation is first performed by selecting the number of destinations of the destination list which is not included in the destination list to be distributed now from the number of destinations of each destination list managed in the device acquired in S1401, adding the selected numbers of destinations, and adding the number of destinations of the destination list to be distributed to the added result. Then, it is determined whether the calculation result is greater than a value of the number of destination lists manageable by the device type of the distribution target device.

When it is determined in S1402 that the number of destinations exceeds the number of destinations manageable by the device, the process proceeds to S10036 (see FIG. 14A). In S10036, the sub-task execution unit 804 notifies the management server 101 of the execution result of the sub-task indicating a distribution error.

In this way, it is prevented that only some of the destination lists are distributed. Conversely, when it is determined in S1402 that the number of destinations does not exceed the number of destinations manageable by the device, the process proceeds to S1403.

Subsequently, in S1403, the sub-task execution unit 804 calculates a difference between the number of destinations included in the destination list for each destination list to be distributed and the number of destinations for each destination list managed in the device acquired in S1401. That is, calculation is performed by subtracting the number of destinations included in the destination list to be distributed from the number of destinations of the destination list managed in the device.

Subsequently, the sub-task execution unit 804 selects differences of which the number of destinations included in the destination list to be distributed is less than the number of destinations in the destination list on the side of the corresponding device, from among the differences obtained in S1403. Then, the destination lists corresponding to the selected differences are distributed in order from the destination lists for which the difference is larger (S1404). In other words, in the example of S1403, the destination lists are distributed in order from the destination lists corresponding to the larger difference. Thus, it is possible to distribute all the destination lists without occurrence of a distribution error midway.

As described above, when the destination lists are distributed to the device managing a plurality of destination lists, the total number of destinations managed in the device currently is acquired and it is determined whether the total number of destinations of the distribution target device after the distribution exceeds the specification of the device. Thus, there is no drawback in which only some of the destination lists are distributed does not occur.

There is no drawback in which the total number of destinations of the distribution target device exceeds the specification of the device midway in the distribution order although the total number of destinations of the distribution target device does not exceed the specification of the device mathematically. That is, according to the embodiment, by controlling the order of the destination lists to be distributed, it is possible to distribute all the destination lists without occurrence of a distribution error midway.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-160374, filed Aug. 29, 2018 and Japanese Patent Application No. 2019-076235, filed Apr. 12, 2019, which are hereby incorporated by reference wherein in its entirety.

What is claimed is:

1. A management system comprising:
a client configured to communicate with a plurality of network devices; and
a manager configured to manage the client,
wherein the manager includes
a first memory storing first instructions, and
a first processor executing the first instructions to cause the manager to:
manage a destination list set including a plurality of destination lists, each of which includes one or more destinations and
generate a task in which the destination list set and a network device to be distributed are set,
wherein the client includes
a second memory storing second instructions, and
a second processor executing the second instructions to cause the client to:
execute a first determination to determine whether the network device to be distributed is able to manage the plurality of destination lists included in the destination list set, based on the task generated by the manager,
execute a second determination to determine whether the number of destinations included in the plurality of destination lists included in the destination list set is within the number of destinations manageable by the network device to be distributed,
distribute distribution data including a plurality of destination lists of the destination list set to the network device to be distributed when it is determined in the first determination that the network device to be distributed is able to manage the plurality of destination lists and it is determined in the second determination that the number of destinations included in the plurality of destination lists of the destination list set is within the number of manageable destinations, and
generate one destination list manageable by the network device to be distributed using the destinations included in the plurality of destination lists of the destination list set when it is determined in the first determination that the network device to be distributed is not able to manage the plurality of destination lists and it is determined in the second determination that the number of destinations included in the plurality of destination lists of the destination list set is within the number of destinations in which the number of manageable destinations, and wherein the distribution data including the generated destination lists is distributed to the network device to be distributed.

2. The management system according to claim 1, wherein the second instructions further cause the client to:
generate a sub-task for the client corresponding to the network device to be distributed set in the task when generating the manager, and
acquire the destination list set and information regarding the network device to be distributed from the manager in accordance with the generated sub-task.

3. The management system according to claim 1, wherein the second instructions further cause the client to notify the manager of a distribution result indicating that the distribution of the distribution data to the network device to be distributed is successful.

4. The management system according to claim 3, wherein the second instructions further cause the client to notify the manager of a distribution result indicating an error irrespective of a determination result of the first determination when the network device to be distributed determines in the second determination that the number of destinations included in the plurality of destination lists of the destination list set is not within the number of manageable destinations.

5. The management system according to claim 4, wherein the first instructions further cause the manager to:
display a distribution result based on the generated task in accordance with the notification from the client, and
automatically generate a recovery task to execute distributions to a plurality of the network devices, in which the distributions to at least some of the network devices is executed successfully, when a recovery instruction of a task corresponding to the distribution result indicating the error is received.

6. The management system according to claim 1, wherein the second instructions further cause the client to:
acquire the number of destinations for each destination list from the network device to be distributed,
determine whether the number of destinations exceeds the number of destinations manageable by the network device to be distributed when the plurality of destination lists of the destination list set are distributed, based on information regarding the acquired number of destinations for each destination list managed in the network device to be distributed, and
calculate a difference between the number of destinations for each destination list included in the destination list set and the number of destinations for each destination list managed in the network device to be distributed the corresponding destination lists when the plurality of destination lists of the destination list set are distributed and it is determined that the number of destinations does not exceed the number of destinations manageable by the network device to be distributed.

7. The management system according to claim 6, wherein the second instructions further cause the client to:
select the differences of which the number of destinations included in the destination lists is less than the number of destinations included in the destination list managed in the corresponding network device to be distributed from among the plurality of destination lists, and
distribute the destination lists in sequence from the destination lists for which the difference is larger.

8. The management system according to claim 1, comprising:
an information processing device including a memory that functions as the first and second memories and a processor that functions as the first and second processors.

9. A method for a management system including a client communicating with a plurality of network devices, and a manager managing the client, the method comprising:
managing, by the manager, a destination list set including a plurality of destination lists, each of which includes one or more destinations;
generating, by the manager, a task in which the destination list set and a network device to be distributed are set;
executing, by the client, a first determination to determine whether the network device to be distributed is able to manage the plurality of destination lists included in the destination list set, based on the task generated by the manager;
executing, by the client, a second determination to determine whether the number of destinations included in the plurality of destination lists of the destination list set is within the number of destinations manageable by the network device to be distributed;
distributing, by the client, distribution data including the plurality of destination lists of the destination list set to the network device to be distributed when it is determined in the first determination that the network device to be distributed is able to manage the plurality of destination lists and it is determined in the second determination that the number of destinations included in the plurality of destination lists of the destination list set is within the number of manageable destinations; and
generating, by the client, one destination list manageable by the network device to be distributed using the destinations included in the plurality of destination lists of the destination list set when it is determined in the first determination that the network device to be distributed is not able to manage the plurality of destination lists and it is determined in the second determination that the number of destinations included in the plurality of destination lists of the destination list set is within the number of destinations in which the number of manageable destinations,
wherein the client distributes the distribution data including the generated destination lists to the network device to be distributed.

10. A non-transitory storage medium on which is stored a computer program for making a computer execute a method in a client communicating with a plurality of network devices and managed by a manager, the method comprising:
executing first determination to determine whether a network device to be distributed is able to manage a plurality of destination lists included in a destination list set, based on a destination list set generated by the manager managing the destination list set including the plurality of destination lists including one or more destinations and a task set by the network device to be distributed;
executing a second determination to determine whether the number of destinations included in the plurality of destination lists included in the destination list set is within the number of destinations manageable by the network device to be distributed;
distributing distribution data including the plurality of destination lists of the destination list set to the network device to be distributed when it is determined in the first determination that the network device to be distributed is able to manage the plurality of destination lists and it is determined in the second determination that the number of destinations included in the plurality of destination lists of the destination list set is within the number of destinations in which the number of manageable destinations; and
generating one destination list manageable by the network device to be distributed using the destinations included in the plurality of destination lists of the destination list set when it is determined in the first determination that the network device to be distributed is not able to manage the plurality of destination lists and it is determined in the second determination that the number of destinations included in the plurality of destination lists of the destination list set is within the number of manageable destinations,
wherein the client distributes the distribution data including the generated destination lists to the network device to be distributed.

* * * * *